United States Patent
Shimada et al.

(10) Patent No.: US 6,191,922 B1
(45) Date of Patent: Feb. 20, 2001

(54) TAPE OR DISC PLAYER HAVING A LID WITH A LOCK MECHANISM

(75) Inventors: Masayuki Shimada, Tokyo; Kiyoyuki Chiba; Kazutaka Nakashima, both of Chiba; Yasuhiro Yamaguchi, Kanagawa; Kazuyasu Tsunezumi, Tokyo, all of (JP)

(73) Assignee: Sony Corporation, Tokyo (JP)

( * ) Notice: Under 35 U.S.C. 154(b), the term of this patent shall be extended for 0 days.

(21) Appl. No.: 09/125,743

(22) PCT Filed: Oct. 9, 1997

(86) PCT No.: PCT/JP97/03653

§ 371 Date: May 27, 1999

§ 102(e) Date: May 27, 1999

(87) PCT Pub. No.: WO98/30074

PCT Pub. Date: Jul. 9, 1998

(30) Foreign Application Priority Data

Dec. 26, 1996 (JP) .................................... 8-348868

(51) Int. Cl.[7] .................... G11B 33/12; G11B 15/675; G11B 17/022

(52) U.S. Cl. ................ 360/137; 360/96.5; 360/99.06; 360/75.1

(58) Field of Search ................ 360/137, 93, 96.5, 360/96.6, 99.02, 99.06; 369/75.1

(56) References Cited

U.S. PATENT DOCUMENTS

| | | | | |
|---|---|---|---|---|
| 4,614,991 | * | 9/1986 | Murakami | 360/137 |
| 4,661,865 | * | 8/1987 | Ida et al. | 360/96.6 |
| 5,359,478 | * | 10/1994 | Kawano | 360/96.6 |
| 5,870,367 | * | 2/1999 | Yamamori | 369/75.1 |

* cited by examiner

Primary Examiner—Craig A. Renner
(74) Attorney, Agent, or Firm—Jay H. Maioli (57) ABSTRACT

An electronic equipment, such as a tape recorder, having a loading section on one surface for loading a recording medium and a lid for opening/closing the loading section. This electronic equipment includes a lock mechanism for locking the lid in the closed position and an unlock mechanism for unlocking the lid. The unlock mechanism has an operating member extended along one lateral surface of the main body portion of the equipment and other lateral surfaces intersecting this one surface for covering the opening side of a recess formed at a corner of the main body portion. The unlock mechanism unlocks the lid by the operating member of the unlock mechanism being moved along the one lateral surface of the main body portion so that the operating member is partially immersed in the recess.

10 Claims, 7 Drawing Sheets

FIG.1

(PRIOR ART)

TAPE OR DISC PLAYER HAVING A LID WITH A LOCK MECHANISM

TECHNICAL FIELD

This invention relates to an electronic equipment, such as a tape recorder or a disc player, having a lid rotatably mounted on a main body portion of the equipment for opening or closing a surface of a main body portion when the lid is rotated. More particularly, it relates to an electronic equipment having a lock mechanism for locking the lid in the closed position.

BACKGROUND ART

Up to now, an electronic equipment, such as a tape player employing a tape cassette as a recording medium, or a disc player, employing a disc cartridge as a recording medium, has been in extensive use.

Figure 1:
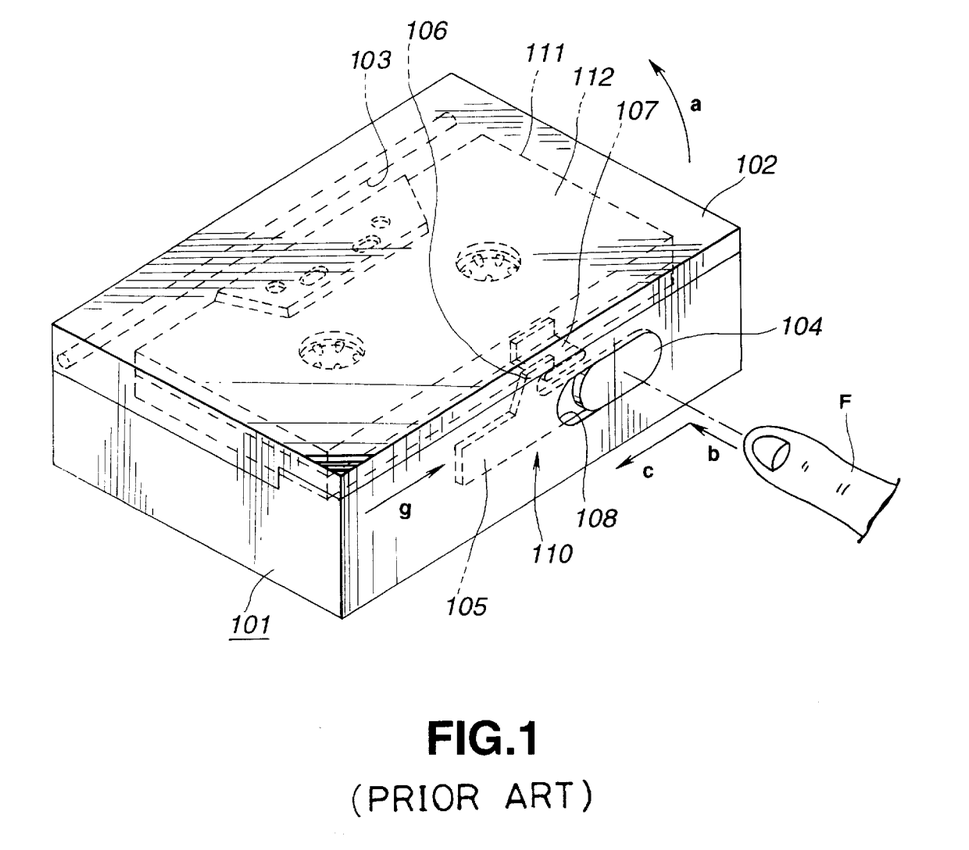
FIG. 1 is a perspective view showing a conventional tape recorder having a lid which is rotatably mounted on a main body portion of the equipment.

This sort of the electronic equipment, such as the tape recorder, has a cassette loading section 111 on one surface of a main body portion 101 on which a tape cassette 112 is loaded, as shown in FIG. 1. The cassette loading section 111 is opened or closed by a lid 102 rotatably mounted via a supporting shaft 103 mounted in turn on the main body portion 101. The lid 102 may be rotated in a direction of arrow a in FIG. 1 for opening the cassette loading section 111 for enabling mounting/dismounting the tape cassette 112.

The lid 102 is rotated about the supporting shaft 103 in the direction opposite to that shown by arrow a for closing the cassette loading section 111 for loading the tape cassette 112 in position on the cassette loading section 111. The lid 1 02 is rotationally biased by a biasing member, not shown, in a direction of opening the cassette loading section 111 in the direction indicated by arrow a in FIG. 1.

Between the main body portion of the equipment 101 and the lid 102, there is mounted a lock mechanism 110 for locking the lid 102 when the lid 102 is at the position of closing the cassette loading section 111. This lock mechanism 110 includes a slider movably mounted for movement along a lateral surface of the main body portion 101 and which has an engagement portion 106 engaged with a mating engagement portion 107 provided on the inner surface on the free end of the lid 102, as shown in FIG. 1.

The slider 105 is biased by a biasing member, not shown, in a direction of an arrow g in FIG. 1, that is in a direction in which the engagement portion 106 is engaged with the mating engagement piece 107. An operating member 104 is mounted on a surface of the slider 105. The operating member 104 is protruded to outside of the main body portion 101 via an elongated opening 108 formed in a lateral surface of the main body portion 101.

The slider 105 is moved in a direction shown by arrow c in FIG. 1, by being moved in the direction shown by arrow c, with the operating portion 104 being thrust with a finger F in the direction of arrow b in FIG. 1, for disengaging the engagement portion 106 from the mating engagement portion 107. If the engagement portion 106 is disengaged from the mating engagement portion 107, the lid 102 is turned in the direction shown by arrow a, under the bias of the biasing member, for opening the cassette loading section 111.

If the thrusting by the finger is removed, the slider 105 is shifted, under the bias of the biasing member, in a direction of engaging the engagement portion 106 with the mating engagement portion 107, in a direction shown by arrow g in FIG. 1.

Meanwhile, since the slider 105 is moved against the bias of the biasing member on thrusting the small-sized operating member 104 protruded via the elongated opening 108 in one lateral surface of the main body portion 101 of an extremely small size as compared to the area of the lateral surface, it is difficult to operate the slider 105 reliably.

In particular, if the tape recorder is further reduced in size, the area of the lateral surface of the main body portion 101 is further reduced and the operating member 104 protruded therefrom is also reduced in size, with the result that the slider 105 becomes further difficult to operate to render it difficult to unlock the lid 102 reliably.

DISCLOSURE OF THE INVENTION

It is therefore an object of the present invention to provide a novel electronic equipment capable of resolving the inconveniences of the conventional equipments, such as a tape recorder or a disc player.

It is another object of the present invention to provide an electronic equipment in which a lid for opening or closing a surface of the main body portion of the equipment can be opened/closed easily for improving operability.

It is another object of the present invention to provide an electronic equipment an electronic equipment that can be further reduced in size.

An electronic equipment according to the present invention, proposed for accomplishing these objects, includes a lid rotatably supported by a substantially rectangular main body portion of the equipment for rotation between a position of closing one surface of the main body portion and a position of closing the one surface, a lock mechanism for locking the lid in the closure position and an unlock mechanism for unlocking the lid. The unlock mechanism includes an operating member made up of a first operating section facing one lateral surface of the main body portion and a second operating section extending from one end of the first operating section in a direction perpendicular to the first operating section. The operating member is movable along the one lateral surface of the main body portion. The unlock mechanism causes the operating member of the lock mechanism to be moved along the one lateral surface of the main body portion for unlocking the lid.

A recess which allows movement of the second operating member on actuation of the operating member is formed in a lateral surface of the main body portion extending perpendicularly to the one lateral surface and which faces the second operating section.

At least one opening passed through by plural operating buttons provided on one lateral surface of the main body portion is formed in the operating member.

At least one finger support for facilitating the operation of the user in moving the operating member is provided on the operating member.

The first operating section of the operating member is provided for extending on the one surface of the main body portion.

The lock mechanism includes an engagement portion provided on one of the main body portion and the lid, a mating engagement portion provided on the other of the main body portion and the lid, and a biasing member for biasing one of the engagement portion and the mating engagement portion in a direction in which the one portion is engaged with the other portion.

An electronic equipment according to an alternative embodiment of the present invention includes a main body portion having a recess at its one corner, a lid rotatably mounted on the main body portion and which is rotated between a position closing one surface of the main body portion and a position opening the one surface, a lock mechanism for locking the lid in the closure position, and an unlock mechanism for unlocking the lid locked by the lock mechanism. The unlock mechanism has an operating member extending along one lateral surface of the main body portion and along another surface intersecting the one lateral surface for covering the opening side of the recess. The lock mechanism unlocks the lid by the operating member of the unlock mechanism being moved along the one lateral surface of the main body portion so that a portion thereof is immersed in the recess.

The operating member includes a first operating portion facing one lateral surface of the main body portion and a second operating section mounted for extending from one end of the first operating section perpendicularly to the first operating section. The operating member is mounted on a lateral surface of the main body portion so that the second operating section is disposed on the opening side of the recess.

These and other objects and advantages of the present invention will become more apparent from the following description of the preferred embodiments of the invention.

BEST MODE FOR CARRYING OUT THE INVENTION

The present invention is now explained with reference to an embodiment in which the invention is applied to the tape recorder.

Figure 2:
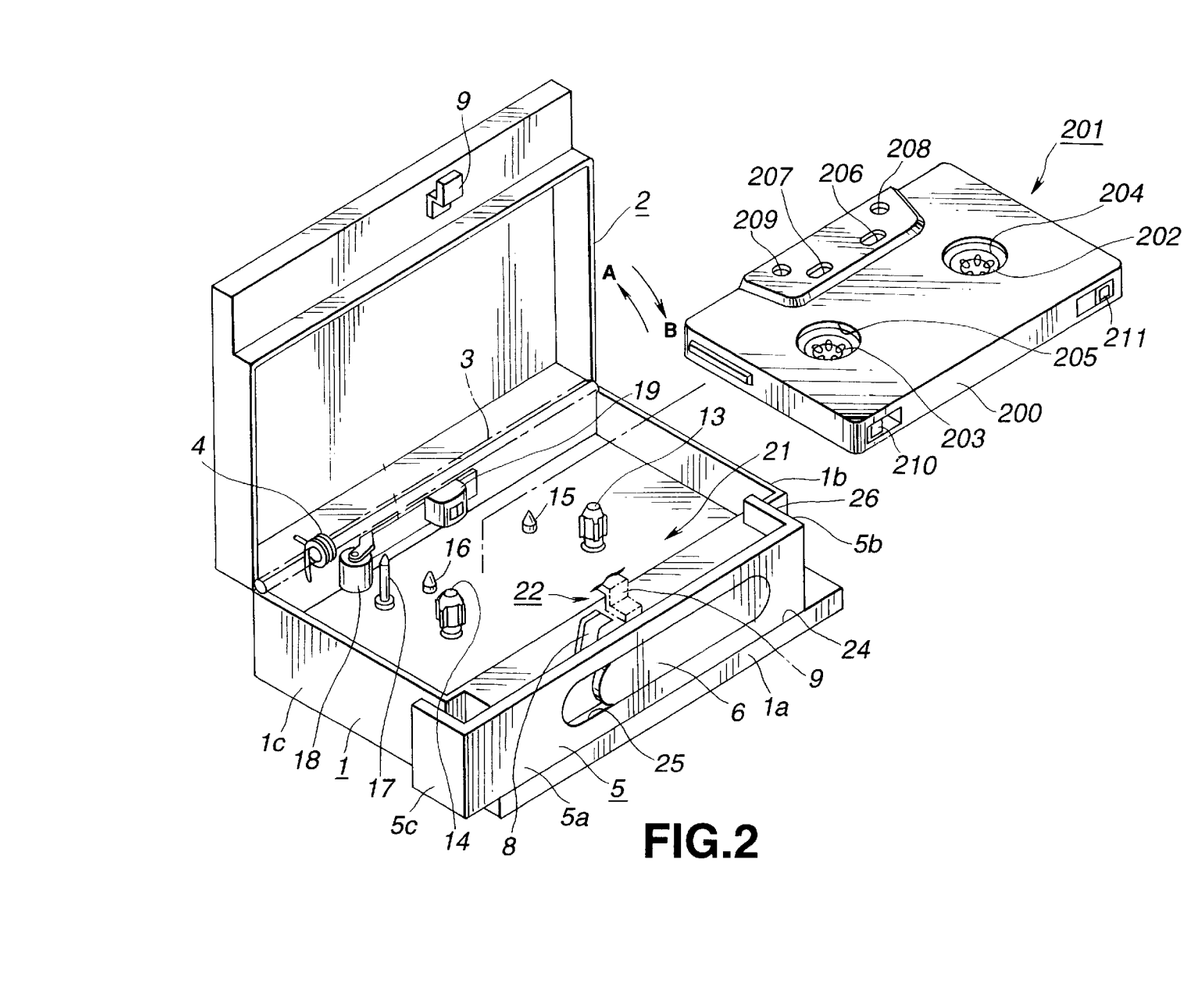
FIG. 2 is a perspective view showing an embodiment of the tape recorder according to the present invention with the lid opened.

Referring to FIG. 2, showing the tape recorder according to the present invention, a cassette loading section 21 is mounted on a surface of a main body portion 1 so that a tape cassette 201 can be loaded on this cassette loading section 21. The cassette loading section 21 can be opened/closed by a lid 2 rotatably mounted via a supporting shaft 3 mounted on the main body portion 1. The lid 2 is rotated in a direction indicated by arrow A in FIG. 2 about the supporting shaft 3 as center of rotation for opening the cassette loading section 21 for enabling loading/unloading of the tape cassette 201.

Also, the lid 2 rotated in a direction indicated by arrow B in FIG. 2, about the supporting shaft 3 as center of rotation, for closing the cassette loading section 21 for loading the tape cassette 201 in position on the cassette loading section 21. Meanwhile, the lid 2 is rotationally biased by a torsion coil spring 4, as a biasing member placed about the supporting shaft 3, in a direction of opening the cassette loading section 21 as indicated by arrow A in FIG. 2.

The tape cassette 201 used in this tape recorder is now explained. Referring to FIG. 2, this tape cassette 201 includes a cassette main body portion 200 made up of an upper half and a lower half abutted and connected to each other. Within the cassette main body portion 200 are rotatably carried a pair of tape reels 202, 203 about which is placed a magnetic tape. This magnetic tape is partially protruded to outside via an opening formed in the front side of the cassette main body portion 200 and in which is intruded a magnetic head as later explained.

In the upper and lower surfaces of the cassette main body portion 200 are formed reel shaft inserting openings 204, 205 for exposing reel hubs mounted centrally of the tape reels 202, 203. The cassette main body portion 200 includes a pair of capstan shaft inserting openings 208, 209 and a pair of positioning holes 206, 207 extending through its upper and lower surfaces. These capstan shaft inserting openings 208, 209 and the positioning holes 206, 207 are formed in the front surface of the cassette main body portion 200. On both sides on the back side of the cassette main body portion 200 are formed mistaken recording preventive pawls 210, 211, as shown in FIG. 2.

At a mid portion of the cassette loading section 21 of the tape recorder for loading the tape cassette 201 are mounted, side-by-side, side, a pair of reel shafts 13, 14. On both sides in the inner portion of the cassette loading section 21 are set a pair of positioning pins 15, 16 and a capstan shaft 17 is set upright in the vicinity of the positioning pin 16. In an inner portion of the cassette loading section 21 towards its back side provided with the supporting shaft 3 supporting the lid 2 is rotatably mounted a pinch roll 18 adapted for being contacted with and separated from the capstan shaft 17. Towards the back surface of the cassette loading section 21 is mounted a magnetic head 19 for being moved back and forth into and out of the cassette loading section 21.

The tape cassette 201 is loaded on the cassette loading section 21 by having the reel hubs of the tape reels 202, 203 engaged with the reel shafts 13, 14 inserted into reel shaft inserting openings 204, 205 and by having the positioning pins 15, 16 engaged in the positioning holes 206, 207. The tape cassette 201 is loaded on the cassette loading section 21 by having the positioning pins 15, 16 engaged in the positioning holes 206, 207 and also by having a surface of the cassette main body portion 200 supported by a height positioning pin, not shown, for thereby being positioned in the horizontal and height directions. If the tape cassette 201 is loaded on the cassette loading section 21, the capstan shaft 17 is inserted into one of the capstan shaft inserting openings 208, 209. The capstan shaft 17 is protruded towards the back surface of the magnetic tape within the cassette main body portion 200.

With the pinch roll 18 pressed against the capstan shaft 17 for clamping the magnetic tape in cooperation with the capstan shaft 17, the latter is run in rotation for rotating the reel shafts 13, 14 for running the magnetic tape at a constant velocity. The magnetic head 19 is advanced towards the tape cassette 201, with the magnetic tape being run at the constant velocity, for contacting with the magnetic tape, for recording and/or reproducing information signals, such as audio signals.

Figure 3:
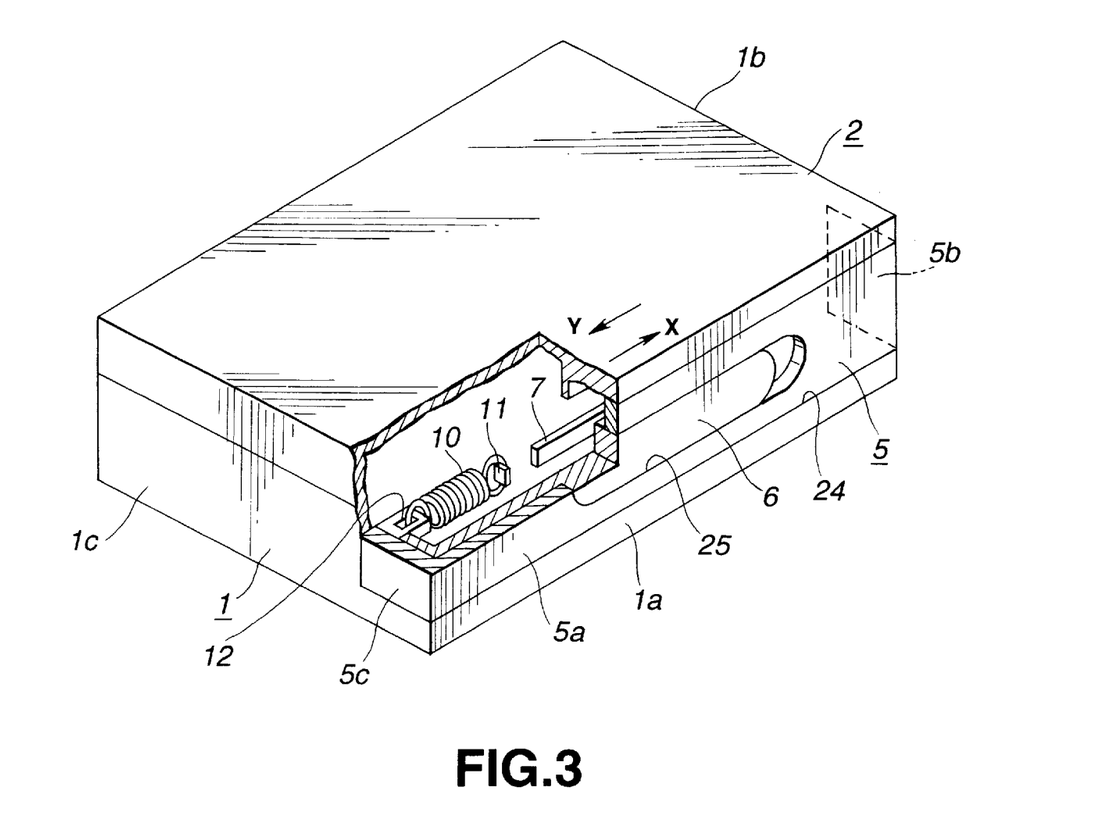
FIG. 3 is a perspective view showing a slider mounted in a main body portion of the tape recorder, with a portion thereof being broken away.

Between the main body portion 1 provided with the cassette loading section 21 and the lid 2 adapted for opening/ closing the cassette loading section 21 is mounted a lock mechanism 22 adapted for locking the lid when the latter is in the position of closing the cassette loading section 21. This lock mechanism 22 includes a slider 7 mounted for movement along the inner surface of a lateral surface 1a of the main body portion 1 as shown in FIG. 3. The slider 7 is biased in a direction indicated by arrow X in FIG. 3 by a tension spring 10 as a biasing member. The tension spring 10 has its one end retained by a retention section 11 provided on the main body portion 1 while having its other end retained by a retention section 12 mounted on an unlock operating plate 5 connected to the slider 7, in a manner as later explained, for biasing the slider 7 along with the operating plate 5 in a direction shown by arow X in FIG. 3.

Figure 4:
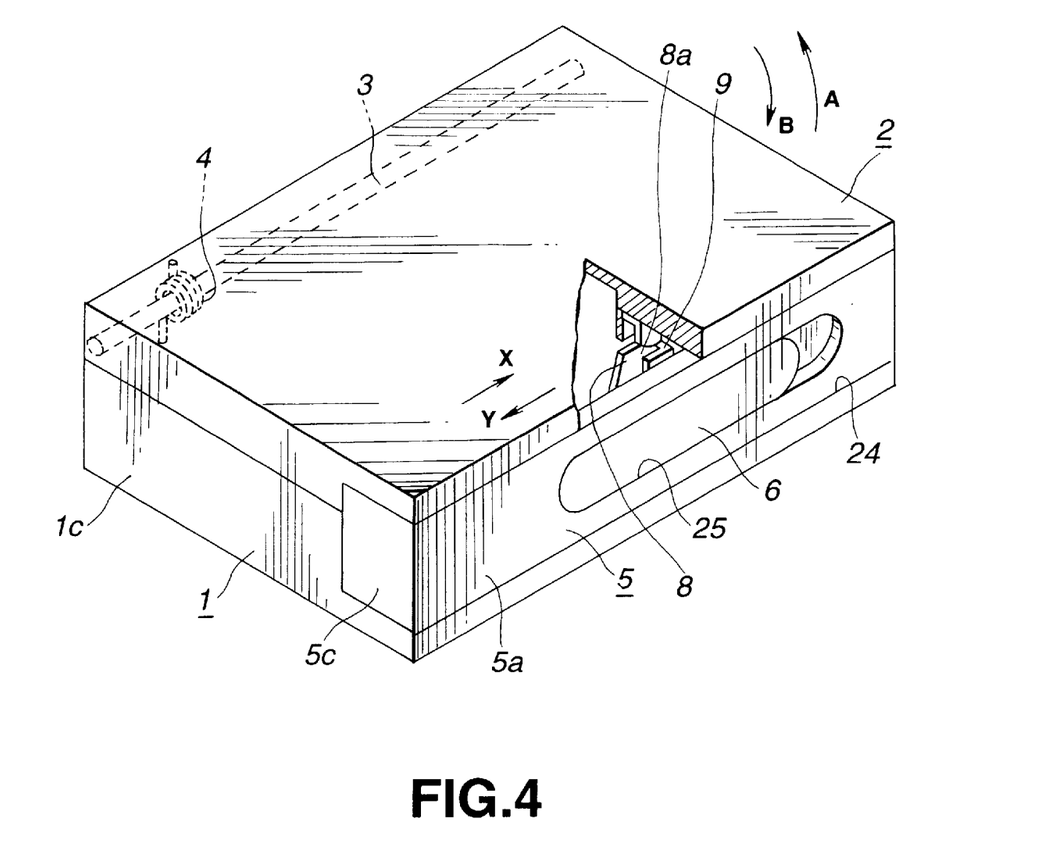
FIG. 4 is a perspective view showing a lock mechanism for the lid, with a portion thereof being broken away.

On a side of the slider 7 towards the opening side of the cassette loading section 21 is an engagement piece 8 adapted for engaging with a mating engagement piece 9 provided on the inner surface towards the free end of the lid 2, as shown in FIGS. 2 and 4. On the distal end of the engagement piece 8 is set a pawl 8a.

If the lid 2 is rotated in the direction shown by arrow B in FIG. 2, against the bias of the coil spring 4, about the supporting shaft 3 as the center of rotation, the distal end of the pawl 8a of the slider 7 is thrust by the mating engagement piece 9 of the lid 2 and is thereby momentarily moved in the direction of arrow Y in FIG. 4 against the bias of the tension spring 10, after which it is again moved in the direction of arrow X in FIG. 4 for engaging the engagement piece 8 with the mating engagement piece 8. With the mating engagement piece 9 engaged with the engagement piece 9, the lid 2 is locked at a position of closing the cassette loading section 21. The tape cassette 201 is loaded as it is maintained in position on the cassette loading section 21.

The lid 2, locked at the position of closing the cassette loading section 21, is unlocked by operation of the operating plate 5 constituting an unlock mechanism movably mounted on the lateral surface 1a of the main body portion 1.

The operating plate 5 has an elongate plate-shaped first operating portion 5a extending the entire length of the lateral surface 1a of the main body portion 1. On one side of this first operating portion 5a is set a second operating portion 5b protruded towards a first other lateral surface 1b extending perpendicularly to the lateral surface 1a of the main body portion 1. On the other end of the first operating portion 5a is set a retention piece 5c protruded towards a second other lateral surface 1c extending perpendicularly to the lateral surface 1a of the main body portion 1. That is, the operating plate 5 has, on both ends of the first operating portion 5a, the second operating portion 5b and the retention piece 5c, both of which extend perpendicularly to the first operating portion 5a, so that the operating plate 5 generally presents a shape of a letter U.

The operating plate 5 is arranged in a guide groove 24 formed in the lateral surface 1a of the main body portion 1 and in the first other lateral surface 1b and the second other lateral surface 1c extending perpendicularly to the lateral surface 1a. The operating plate 5 is moved within this guide groove 24 for assuring its stable movement. Also, the operating plate 5 can be arranged within the guide groove 24 without being protruded from the peripheral surface of the main body portion 1.

The portion of the lateral surface 1a and the first other lateral surface 1b of the main body portion 1 facing the second operating portion 5b of the operating plate 5 is formed with a recess 26 sufficient to allow for movement of the operating plate 5 enough to permit disengagement of the engagement piece 8 from the mating engagement piece 9 of the lid 2.

In a mid portion of the first operating portion 5a of the operating plate 5 is formed an opening 25 having its long diameter extending in the longitudinal direction of the operating plate 5. In this opening 25 is fitted a swollen-out portion 6 formed on the lateral surface 1a of the main body portion 1 for facing the outside of the main body portion 1. On this swollen-out portion 6 are mounted operating buttons, such as a playback button, fast feed button or rewind button, for selecting the operating mode of the tape recorder.

Figure 5:
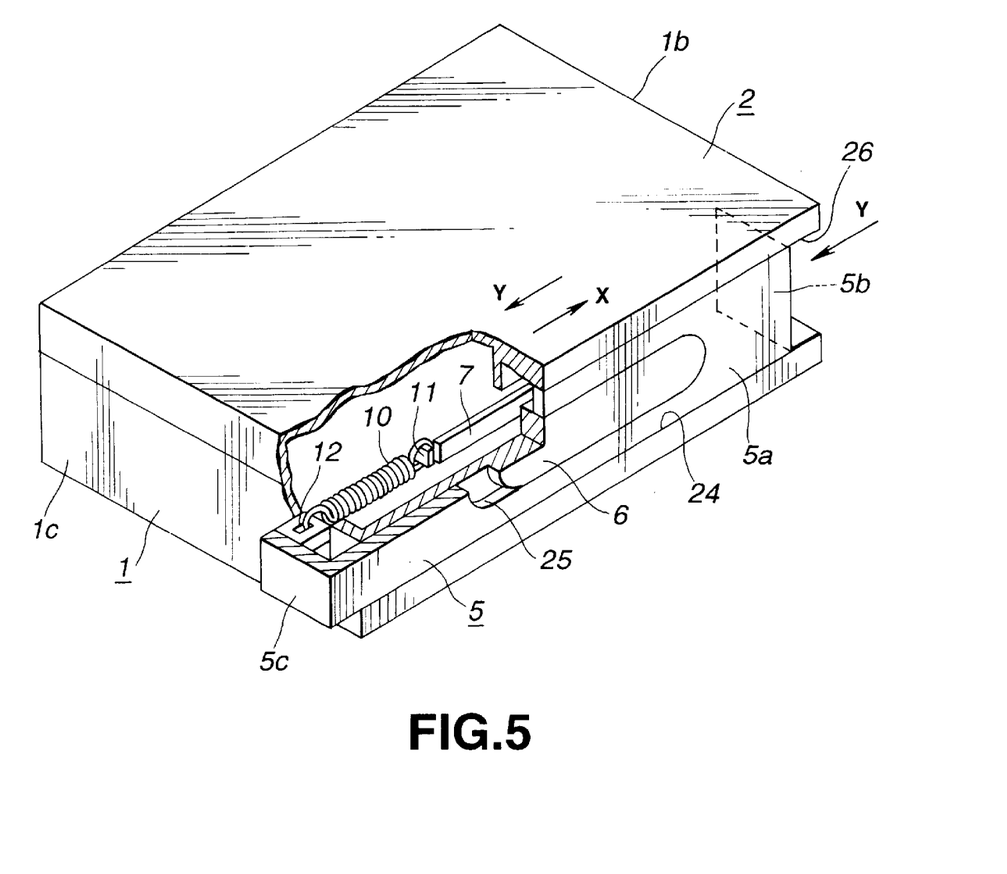
FIG. 5 is a perspective view showing the state of opening the lid which has closed a cassette loading section.

For opening the lid locked in the position of closing the cassette loading section 21, the operating plate 5 is moved in a direction of arrow Y in FIG. 5, with the first operating portion 5a thrust with the finger end, or with the second operating portion 5b thrust. If thrust in the direction of arrow Y in FIG. 5, the operating plate 5 is moved in a direction shown by arrow Y in FIGS. 4 and 5, against the bias of the tension spring 10, within a range of the recess 26 formed in the main body portion 1. If the operating plate 5 is moved against the force of the tension spring 10, the engagement piece 8 is moved in the same direction for disengaging the lid 2 from the mating engagement piece 9. If the engagement piece 8 is disengaged from the mating engagement piece 9, the lid 2 is rotated in a direction of arrow A in FIG. 5, under the bias of the tension coil spring 4, for opening the cassette loading section 21. If the thrusting force applied on the operating plate 5 is removed, the operating plate 5 is automatically returned to its initial position under the bias of the tension spring 10.

Since the operating plate 5 of the unlock mechanism for unlocking the lid 2 is elongated along the lateral surface 1a of the main body portion 1, it can be moved easily in stability.

Since the operating plate 5 can be moved by simply thrusting the second operating portion 5b on its one end, the main body portion 1 can be manipulated by holding it with one hand, thus facilitating the operation.

For closing the cassette loading section 21, the lid 2 is rotated in a direction of arrow B in FIG. 2, against the force of the torsion coil spring 4. At this time, the mating engagement piece 9 thrusts the distal end of the engagement piece 8 to move the operating plate 5 transiently in the direction of arrow Y in FIG. 4. The operating plate 5 is then moved in the direction of arrow X in FIG. 4, under the bias of the tension spring 10, for engaging the mating engagement piece 9 with the engagement piece 8, for thereby locking the lid 2.

An alternative embodiment of the present invention is now explained.

In the present embodiment, the invention is applied to a tape recorder employing the aforementioned tape cassette 201 as a recording medium.

Figure 6:
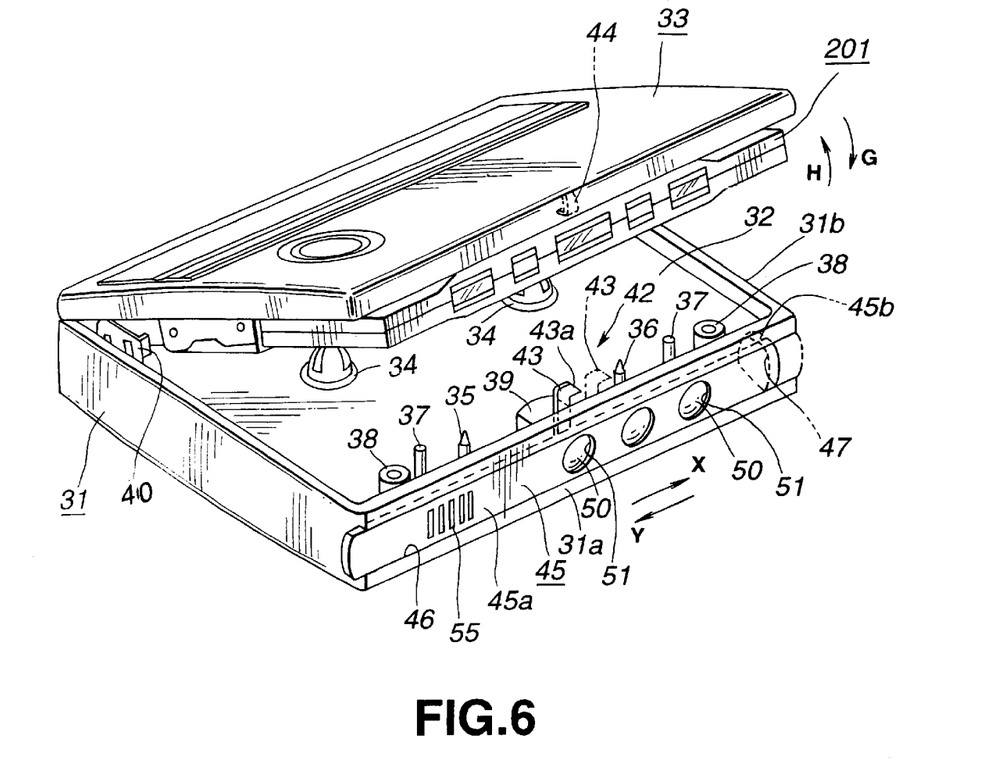
FIG. 6 is a perspective view showing another embodiment of the tape recorder according to the present invention with the lid opened.

Referring to FIG. 6, the tape recorder of the present embodiment includes a cassette loading section 32 on one side of a main body portion 31 and a lid 33 for opening/closing this cassette loading section 32, as shown in FIG. 6. Although not shown, this lid 33 has both sides on its proximate end rotatably supported via a rotary arm 40 on the back side of the main body portion 31. The lid 33 is rotated in the directions indicated by arrow G and H in FIG. 6 about the rotary arm 40 as the center of rotation for opening/closing the cassette loading section 32.

On the cassette loading section 32 of the present tape recorder are mounted a pair of reel shafts 34, 34 engaged with reel hubs of tape reels 202, 203 for rotating these tape reels 202, 203, as in the previously described tape recorder. On the cassette loading section 32 are set a pair of positioning pins 35, 36 for engaging with the positioning holes 206, 207 for setting the loading position of the tape cassette 201. In addition, a pair of capstan shafts 37, 37 are set upright on the cassette loading section 32 for allowing constant velocity rotation of the magnetic tape of the tape cassette 201 and a pair of pinch rolls 38, 38 are rotatably mounted on the cassette loading section 32 for being abutted against these capstan shafts 37, 37 for selectively clamping the magnetic tape. The main body portion 31 also includes a magnetic head 39 adapted for being moved into and out of the cassette loading section 32 for contacting with the magnetic tape run at a constant velocity for recording and/or reproducing information signals such as audio signals. This tape recorder is configured for running the magnetic tape in both directions for recording and/or reproducing the information signals.

The present tape recorder is constructed so that the tape cassette 201 can be loaded on the cassette loading section 32 with the back side of the tape cassette 201 provided with the mistaken recording preventive pawls 210, 211 as an inserting side. Thus, the capstan shafts 37, 37, pinch rolls 38, 38 and the magnetic head 39 are mounted towards the front side of the main body portion 31, as shown in FIG. 6.

Between the main body portion 31 provided with the cassette loading section 32 and the lid 33 adapted for opening/closing the cassette loading section 32 is mounted a lock mechanism 42 adapted for locking the lid 33 when the latter is in the position of closing the cassette loading section 32. This lock mechanism 42 is made up of an engagement piece 43 mounted on a slider movably mounted for movement along the inner surface of a lateral surface 31a of the main body portion 31 and a mating engagement piece 44 provided on the inner surface of the free end of the lid 33. On the distal end of the engagement piece 43 is set a pawl piece 43a.

Similarly to the slider 7 of the previous embodiment, the slider of the lock mechanism 42 is biased by a biasing member in a direction indicated by arrow X in FIG. 6 in which the engagement piece is engaged with the mating engagement piece 8. This biasing member is mounted under tension between a portion of the main body portion 31 and an unlock operating plate 45 coupled to the slider as later explained for biasing the slider along with the operating plate 45 in the direction indicated by arrow X in FIG. 6.

When the lid 33 is rotated in the direction of arrow G in FIG. 6 as far as a position of closing the cassette loading section 32, the engagement piece 44 is engaged with the engagement piece 43 of the slider for locking the cassette loading section 32 in the closed position. By the lid 33 being locked in the position of closing the cassette loading section 32, the tape cassette 201 is loaded in position in the cassette loading section 32.

The lid 33 locked in the position of closing the cassette loading section 32 is unlocked by the operation of the operating plate 45 constituting the unlock mechanism movably mounted on the lateral surface 31a of the main body portion 31.

The operating plate 45 includes a first operating portion 45a as an elongated plate-shaped portion extending the entire length of the lateral surface 31a of the main body portion 31 as shown in FIG. 6. The operating plate 45 also includes, on one end of the first operating portion 45a, a second operating portion 45b as a portion protruded towards the first other lateral surface 31b extending perpendicularly to the lateral surface 31a of the main body portion 1, so that the operating plate 45 generally presents the shape of a letter L. This operating plate 45 is mounted with the first operating section 45a fitted in a guide groove 46 formed in the lateral surface 31a of the main body portion 31 and with the second operating section 45b facing a recess 47 formed by segmenting a corner portion extending from the lateral surface 31a of the main body portion 31 to the first other lateral surface 31b extending perpendicularly to the lateral surface 31a.

The operating plate 45 has its first operating section 45a guided by the guide groove 46 so as to be moved in the directions indicated by arrow X or arrow Y in FIG. 6. This operating plate 45 is biased by the biasing member in the direction in which the engagement piece 43 is engaged with the mating engagement piece 44 as indicated by arrow X in FIG. 6.

In a corner portion of the main body portion 31 extending from the lateral surface 31a as far as the first other lateral surface 31b thereof is of a depth to permit the operating plate 45 to be moved in the direction of arrow Y in FIG. 6 to permit disengagement of the engagement piece 43 from the mating engagement piece 44. Specifically, the recess 47 serves as a clearance to permit movement of the second operating section 45b of the operating plate 45. On the other hand, the second operating section 45b on one end of the operating plate 45 is a portion which overlies the opening side of the recess 47 extending from the lateral surface 31a to the first other lateral surface 31b of the main body portion 31.

Figure 7:
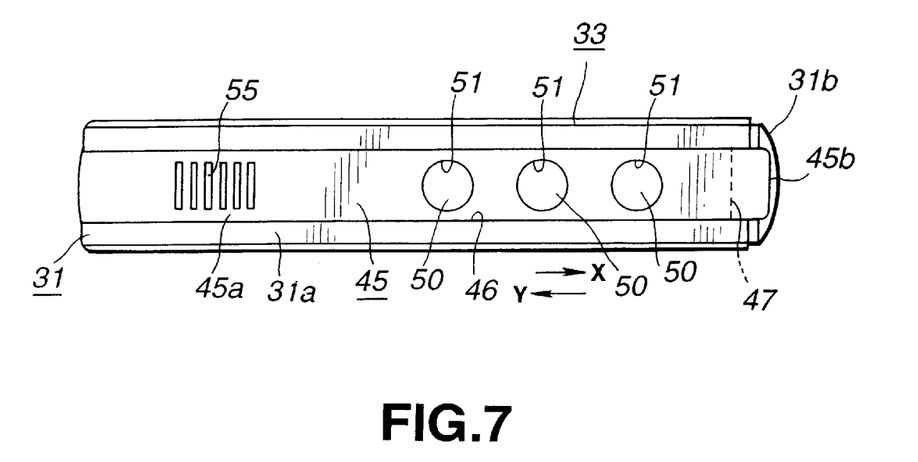
FIG. 7 is a front view of the tape recorder.
Figure 8:
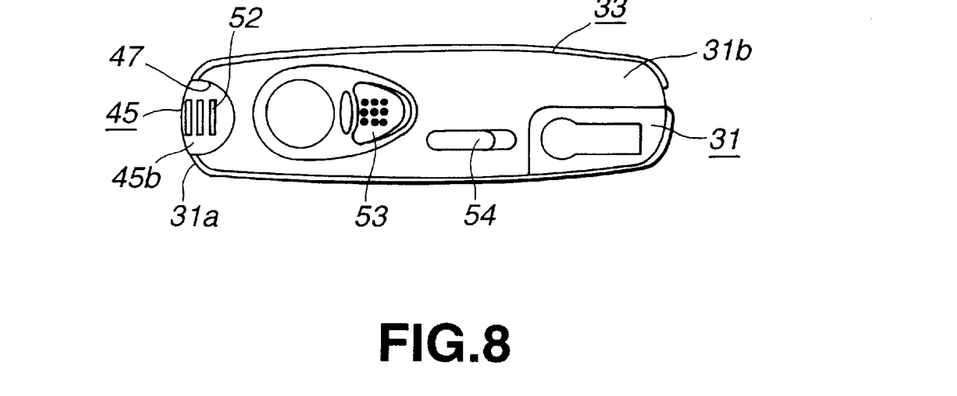
FIG. 8 is a side view thereof.

The operating plate 45, biased by the biasing member, has its biased position controlled by position control means, not shown, so that the operating plate 45 will be flush with the surface extending from the lateral surface 31a to the first other lateral surface 31b, as shown in FIG. 7.

The first operating section 45a of the operating plate 45 is provided with a circular opening portion 51 for exposing to outside plural operating buttons 50 adapted for selecting the operating mode of the tape recorder provided on the surface of the main body portion 31. The operating buttons 50 facing this opening 51 is adapted for being immersed into and receded from the opening 51. That is, the operating buttons 50 are immersed into and receded from the opening 51 by movement of the operating plate 45. When the operating plate 45 is biased by the biasing member and hence is in the inoperative position, as shown in FIG. 7, the operating plate 45 is exposed to outside of the lateral surface 31a via opening 51 so as to be ready for thrusting operation.

On the surface of the second operating section 45b of the operating plate 45 is formed a roughed finger support 52 designed to permit positive engagement with the finger end for manually moving the operating plate 45. On the surface of the first operating section 45a is also formed another finger support 55 for finger engagement so that the operating plate 45 can be reliably operated even on thrusting the first operating section 45a.

On the other lateral surface 31b of the main body portion 31 are provided a holding button 53 and a volume adjustment button 54. The hold button 53 holds the selected operating mode of the tape recorder.

For opening the lid 33 locked in the position of closing the cassette loading section 32 of the tape recorder, the operating plate 45 is moved in the direction shown by arrow Y in FIG. 7, with the first operating section 45a thrust by finger or with the second operating section 45b thrust. When thrust in the direction of arrow Y in FIG. 7, the operating plate 45 is moved in the direction shown by arrow Y in FIG. 7, against the bias of the biasing member within the extent of the recess 47 formed in the main body portion 31. When the operating plate 45 is moved against the bias of the biasing member, the engagement piece 43 is simultaneously moved in the same direction for disengaging the lid 33 from the mating engagement piece 44. When the engagement piece 43 is disengaged from the mating engagement piece 44, the lid 33 is rotated in the direction of arrow H in FIG. 6 under the bias of the biasing member for opening the cassette loading section 32. When the thrusting pressure is removed, the operating plate 45 is automatically returned to its initial position under the bias of the biasing member.

Since the operating plate 45 of the unlock mechanism for unlocking the lid 33 is elongated along the lateral surface 31a of the main body portion 31, it can be moved easily in stability.

Since the operating plate 45 can be moved by simply thrusting the second operating portion 45b on its one end, the main body portion 31 can be manipulated by holding it with one hand, thus facilitating the operation.

Since the recess 47 provided at a corner of the main body portion 31 is covered by a portion of the operating plate 45, the tape recorder is not impaired in appearance, while the operating plate 45 and the main body portion 31 can be integrated as to appearance.

Although the present invention is applied to a tape recorder in the above-described embodiments, the present invention can be applied extensively to electronic equipments having lids for opening/closing one surface of the main body portion thereof.

Specifically, the present invention can be applied to a variety of equipments such as a disc recording and/or reproducing apparatus having a disc cartridge loading section on one surface of the main body portion and a lid for opening/closing this loading section.

INDUSTRIAL APPLICABILITY

With the above-described electronic equipment of the present invention, since the lid can be unlocked by operating an operating plate movably mounted for movement along one lateral surface of the main body portion, the unlock operation an be realized easily and reliably in stability.

What is claimed is:

1. An electronic equipment comprising:
   a main body portion having a recess at one corner thereof;
   a lid rotatably mounted on said main body portion and which is rotated between a position closing one surface of the main body portion and a position opening said one surface;
   a lock mechanism for locking said lid in a closure position; and
   an unlock mechanism for unlocking the lid locked by said lock mechanism, said unlock mechanism having an operating member extending along one lateral surface of the main body portion and along another surface intersecting said one lateral surface for covering the opening side of said recess;
   said lock mechanism unlocking said lid by the operating member of the unlock mechanism being moved along said one lateral surface of the main body portion so that a portion thereof is immersed in said recess.

2. The electronic equipment as claimed in claim 1 wherein said operating member includes a first operating section facing said one lateral surface of the main body portion and a second operating section mounted for extending from one end of the first operating section perpendicularly to the first operating section and wherein said operating member is mounted on a lateral surface of the main body portion so that said second operating section is disposed on the opening side of said recess.

3. The electronic equipment as claimed in claim 2 wherein said operating member is provided with at least one opening passed through by plural operating buttons provided on said one lateral surface of said main body portion.

4. The electronic equipment as claimed in claim 2 wherein said operating member is provided with at least one finger support for facilitating the operation of the user in moving said operating member.

5. The electronic equipment as claimed in claim 2 wherein said first operating section of said operating member is provided on said one lateral surface of the main body portion.

6. The electronic equipment as claimed in claim 1 wherein said lock mechanism includes a first engagement portion provided on one of the main body portion and the lid, a second engagement portion for mating with said first engagement portion provided on the other of the main body portion and the lid, and a biasing member for biasing one of the first engagement portion and the second engagement portion in a direction in which said one portion is engaged with the other portion.

7. An electronic equipment comprising:
   a substantially rectangular main body portion;
   a lid rotatably supported by said main body portion for rotation between a position closing one surface of the main body portion and a position opening said one surface;
   a lock mechanism for locking said lid in a closure position; and
   an unlock mechanism for unlocking the lid, said unlock mechanism including an operating member made up of a first operating section facing one lateral surface of the main body portion and a second operating section extending from one end of said first operating section in a direction perpendicular to the first operating section, said operating member being movable along said one lateral surface of said main body portion;
   said unlock mechanism causing said operating member to be moved along said one lateral surface of the main body portion for unlocking the lid; and wherein
   a recess which allows movement of said second operating section on actuation of said operating member is formed in a lateral surface of the main body portion extending perpendicularly to said one lateral surface and which faces said second operating section; and
   at least one opening passed through by plural operating buttons provided on said one lateral surface of said main body portion is formed in said operating member.

8. The electronic equipment as claimed in claim 1 wherein at least one finger support for facilitating the operation of the user in moving said operating member is provided on said operating member.

9. The electronic equipment as claimed in claim 1 wherein the first operating section of said operating member is provided for extending on said one surface of the main body portion.

10. The electronic equipment as claimed in claim 1 wherein said lock mechanism includes a first engagement portion provided on one of the main body portion and the lid, a second engagement portion for mating with said first engagement portion provided on the other of the main body portion and the lid, and a biasing member for biasing one of the first engagement portion and the second engagement portion in a direction in which said one portion is engaged with the other portion.

* * * * *